United States Patent [19]

Fiorentini et al.

[11] Patent Number: 5,620,710
[45] Date of Patent: Apr. 15, 1997

[54] FROTH SYSTEM FOR CONTINUOUS MANUFACTURE OF POLYURETHANE FOAM SLAB-STOCKS

[75] Inventors: Carlo Fiorentini, Saronno, Italy; Anthony C. Murray Griffiths, Paphos, Cyprus

[73] Assignee: Foaming Technologies Cardio BV, Netherlands

[21] Appl. No.: 480,242

[22] Filed: Jun. 7, 1995

Related U.S. Application Data

[62] Division of Ser. No. 271,918, Jul. 8, 1994.

[30] Foreign Application Priority Data

Jul. 14, 1993 [IT] Italy .................. M193A1546
Sep. 30, 1993 [IT] Italy .................. M193A2090

[51] Int. Cl.⁶ .................. B29C 44/28; B29C 44/50
[52] U.S. Cl. .................. 425/4 C; 425/89; 425/224; 425/817 C
[58] Field of Search .................. 425/4 C, 89, 224, 425/817 C

[56] References Cited

U.S. PATENT DOCUMENTS

| | | | |
|---|---|---|---|
| 2,774,106 | 12/1956 | Bethe | 425/817 C |
| 3,181,199 | 5/1965 | Voelker | 425/4 C |
| 3,184,419 | 5/1965 | Merriman | 521/917 |
| 3,325,823 | 6/1967 | Boon | 264/41 |
| 3,517,414 | 6/1970 | Carson, Jr. | 425/86 |
| 3,660,548 | 5/1972 | Komada et al. | 264/46.2 |
| 3,786,122 | 1/1974 | Berg | 264/46.2 |
| 3,810,860 | 5/1974 | Doyle | 528/85 |
| 3,821,130 | 6/1974 | Barron et al. | 521/133 |
| 3,823,099 | 7/1974 | Doyle | 521/120 |
| 3,838,074 | 9/1974 | Hoshimo et al. | 521/175 |
| 3,862,879 | 1/1975 | Barron et al. | 428/95 |
| 4,001,180 | 1/1977 | Doyle et al. | 528/80 |
| 4,074,960 | 2/1978 | Dockray et al. | 425/817 C |
| 4,121,529 | 10/1978 | Smith et al. | 405/171 |
| 4,191,254 | 3/1980 | Baughman et al. | 166/286 |
| 4,248,811 | 2/1981 | Doyle et al. | 264/46.6 |
| 4,254,179 | 3/1981 | Carson, III et al. | 428/311 |
| 4,288,564 | 9/1981 | Conover et al. | 264/45.3 |
| 4,298,557 | 11/1981 | Bradford et al. | 425/224 |
| 4,316,875 | 2/1982 | Barth et al. | 422/133 |
| 4,337,318 | 6/1982 | Doyle et al. | 521/80 |
| 4,370,117 | 1/1983 | Smith | 425/224 |
| 4,492,664 | 1/1985 | Bruno | 425/817 C |
| 4,504,429 | 3/1985 | Griffiths | 425/89 |
| 4,567,008 | 1/1986 | Griffiths | 425/224 |
| 4,735,970 | 4/1988 | Sommerfeld et al. | 521/128 |
| 4,906,672 | 3/1990 | Stone et al. | 264/50 |
| 5,006,569 | 4/1991 | Stone | 521/118 |
| 5,104,904 | 4/1992 | Glynn et al. | 521/99 |
| 5,120,770 | 6/1992 | Doyle et al. | 521/99 |
| 5,182,313 | 1/1993 | Carson | 521/155 |

FOREIGN PATENT DOCUMENTS

| | | |
|---|---|---|
| 0058553 | 8/1982 | European Pat. Off. . |
| 0084384 | 7/1983 | European Pat. Off. . |
| 0114741 | 8/1984 | European Pat. Off. . |
| 1524032 | 5/1968 | France . |
| 2023961 | 8/1970 | France . |
| 2517591 | 6/1983 | France . |
| 61613 | 5/1968 | German Dem. Rep. . |
| 1169648 | 5/1964 | Germany . |
| 1504091 | 7/1969 | Germany . |
| 1956419 | 6/1970 | Germany . |
| 1190554 | 2/1988 | Italy . |
| 2116574 | 9/1983 | United Kingdom . |
| WO91/08243 | 6/1991 | WIPO . |
| WO91/12287 | 8/1991 | WIPO . |

*Primary Examiner*—Robert Davis
*Attorney, Agent, or Firm*—Cushman Darby & Cushman IP Group of Pillsbury Madison & Sutro LLP

[57] ABSTRACT

A process and a system for the continuous manufacture of polymeric foams. Reactive chemical components and additives comprising a low boiling blowing agent are mixed under pressure; the mixture is then frothed before chemical reaction takes place by feeding the mixture through a pressure equalizing and frothing device having a pressure-drop zone opening into a frothing cavity having an output aperture to discharge the froth onto a moving substrate.

5 Claims, 4 Drawing Sheets

FROTH SYSTEM FOR CONTINUOUS MANUFACTURE OF POLYURETHANE FOAM SLAB-STOCKS

This is a division of application Ser. No. 08/271,918, filed Jul. 8, 1994.

FIELD OF THE PRESENT INVENTION

The present invention relates to the production of polymeric foams by using the frothing technique, and more particularly is directed to a process and a system for the continuous production of flexible and rigid slab-stocks, normally used for providing panelling, soft cushioning, and the like.

BACKGROUND OF THE PRESENT INVENTION

Polymeric foams in particular polyurethane foams are well known. In general their preparation requires the mixing of reactive chemical components, such as a polyol and an isocyanate, in the presence of normally used additives such as a suitable catalyst, a surfactant or cell control agent, and water which chemically reacts with the isocyanate to produce the carbon dioxide for blowing the foam.

In the continuous production of flexible foams and particularly in the production of flexible foams in slab-stocks, as currently practised on conventional machines, it is common practice to spread or pour a thin layer of the mixture in a liquid state onto a moving sheet substrate provided on a slightly sloped conveyor and then the foam is allowed to rise freely, due to reaction between the chemical components, until the total expansion of the foam is obtained. The foam is then allowed to cure and thereafter is cross-sawn into blocks. Convention process and apparatus are described, for example, in U.S. Pat. Nos. 3,325,823 and 4,492.664.

In order to avoid a situation where the liquid mix underrunning the foam, and to allow the production of uniform blocks, use of a small slope, and high speed for the conveyor and high chemical out put are usually required. This results in costly and large space consuming machines, as well as in an excessively high production rate and very large scale plants.

In an attempt to partially remedy the problems and disadvantages involved by a conventional process, U.S. Pat. No. 3,786,122 suggests an alternative foaming procedure, in which liquid reactants are mixed and introduced in the liquid state, at the bottom of a prefoaming trough. This allows the mixture to expand upwardly causing the pre-expanded mixture to flow out of the vessel, on a channel-shaped sheet material travelling on a conveyor device. Although this process eliminates the use of reciprocating mixing heads in the production of a continuous slab of a polymeric foam, nevertheless some problems arise due to "build-up" of the foam in the trough which causes a progressive narrowing or reduction of the useful volume of the trough and consequently a reduction in the residence time in the through. The partly expanded foam is still of a relatively high density and low viscosity and limits the slope angle that can be used for the foaming conveyor. Consequently, the risk of foam underrunning, therefore, still exists.

Although the main object of the U.S. Pat. No. 3,786,122 was to employ a conveyor shorter in length, running at a speed slower than the conveyor in a conventional machine, the fact that the mixture emerging from the vessel is still in a liquid state practically prevents the speed and the length of the conveyor to be reduced to any substantial extent. Therefore the resulting slab-stock foaming machine was large and still required large spaces. A Publication PU Handbook G. HOERTEL Ed. Carl Hanser Verlang—1985 pages 162–168 describes a further variation of the pouring technique in the attempt to achieve an uniform lay-down of a mixture of polyurethane components by a fixed mixhead. This mixture being discussed by Hoertel is not a froth nor does blowing occur. According to Hoertel the mixture is spread onto the whole width of the conveyor by the use of a distribution bar through which the mixture is delivered across a broad front. In the same manner the resulting flow is similar to that resulting from the trough used in the U.S. Pat. No. 3,786, 122; depending on the volume of the distribution bar and the chemical reactivity of the foam system, the mixture is delivered onto a substrate as a clear (no reaction) or an already creamy (reaction started) liquid. Consequently, density and viscosity of the mixture still depend on the volume of the distribution bar in which chemical foaming takes place. Therefore, the distribution bar according to Hoertel does not substantially differ from the trough system of U.S. Pat. No. 3,786,122.

The frothing process is a well known technique in polyurethane technology but not in the production of slab stock foam. When frothing, a non-reactive inert gas, or blowing agent, is mixed under pressure in a liquid state or in solution with the polyurethane chemical components in a mixer. The pressure is subsequently released causing the frothing or pre-expansion. The vaporization of the blowing agent causes the cells to grow and to foam the liquid reaction mixture which cures to form an elastomer.

Typical blowing agents are the various chlorofluorocarbons (CFC), however certain environmental problems are associated with the use of CFC materials. Therefore, many attempts have been made to produce foamed polyurethane materials, by frothing with carbon dioxide ($CO_2$).

Carbon dioxide ($CO_2$) as non-reactive blowing agent, in the frothing technique, has been suggested for example by U.S. Pat. Nos. 3,184,419 and 5,120,770.

According to these two patents, the reaction mixture is subjected to a pressure during mixing, to maintain the blowing agent in the liquid state. Thereafter the mixture is ejected at atmospheric pressure causing a turbulent vaporisation of the blowing agent. Therefore, while the froth technique and the use of an inert blowing agent incorporated in a liquid state into the reaction mixture, allows the manufacture of a foam of reduced density, nevertheless the cell structure is of very inconsistent quality due to irregular shaped and oversized cells or bubbles being present.

Although frothing with inert gas, in particular $CO_2$, is a well known potential technique, up to now no successfully practicable frothing process and system have been suggested or discovered for use with and in slab stock foam production.

In an attempt to solve the problem of slab stock production without use of chlorofluorocarbon blowing agents, and by using the frothing techniques, it has been now discovered that the suitable release of the mixture under pressure must take place under controlled conditions. Use of controlled conditions in the production of polymeric foams positively influences the growth of the cells during initial frothing expansion of the mixture, which is of importance in the production of slab stock.

Presently, the need for a new foaming process and system in the continuous manufacturing of flexible slab-stock or other continuous foam production lines, in which the froth-

OBJECTS AND SUMMARY OF THE PRESENT INVENTION

It is an object of the present invention to provide a foaming process as referred above, by which it is possible to advantageously use a non-reactive liquid blowing agent, preferably carbon dioxide, to froth, without negatively affecting the cellular structure of the foam, to provide an appropriate bubble free commercial product.

Another object of the present invention is to provide a process and a system as referred to above, for continuous foaming, in the production of flexible or rigid slab-stocks, in which the frothing of the mixture may be usefully performed under controlled conditions allowing the spreading of the mixture on a moving substrate in the form of a high viscous froth, without involving turbulent vaporisation of the blowing agent. This also permits production of a low density foam on the order of 14 kg/m$^3$ (0.87 pcf).

A further object of the invention is to provide a foaming process and system as referred to above, which make possible the use of a low output plant running at very low speeds thereby permitting foam lines that are much shorter in length, in comparison to conventional or known machines or production lines or plants, avoiding limitations of the conventional systems while maintaining the advantageous features thereof. This also results in a dramatic reduction of exhaust, from a shortened line operating at slower conditions, so That the volume/hour of exhaust fumes that require scrubbing or other cleaning effort prior to release is similarly reduced. Equally important is the lessening of the amount of factory air that needs to be conditioned thereby reducing energy costs associated with slab stock production.

The main objectives of the present invention are therefore the elimination of cloro-fluoro carbons (CFC) and volatile organic compounds (VOC) from the formulation and substitution thereof with a less expensive component, as well as production of soft, low density foam, with a very homogeneous cell structure, free from large bubbles, pinholes and visible defects.

Contrary to general trends of conventional prior art, the invention resides in mixing under pressure a reactive blend of polymeric chemical components and an inert, low boiling blowing agent, followed by frothing the mixture, prior to the start of any reaction, under pressure-controlled conditions through a pressure equalising and frothing device having an elongated pressure-drop zone extending cross-wise to the moving direction of a substrate. Then the frothing mixture is restrained along a frothing passageway or cavity. Thereafter, reaction of the frothed mixture begins. That frothing passageway or cavity preferably has an output aperture of larger area relative to the area of the aperture or outlet of the pressure-drop zone. According to the invention, the pressure during mixing ranges preferably from 5 to about 18 bar.

The present invention is unique in the use of a frothed form of the mixed chemical ingredients comprising the polymeric foam to form slab stock. The present invention is unique too in that it uses an environmentally safe blowing agent to develop the froth in the manufacture of slab-stock foam. Such foam slab stock can be either flexible or rigid foam. The invention employs a specially designed discharge or lay-down head, called a gate bar, that uniquely aids the mixed foam ingredients to froth. This frothing occurs in a very controlled way by use of an elongated pressure-drop zone, as part of the gate bar, and then by having the mixed, frothing material pass through a frothing passageway or cavity wherein gaseous blowing agent is gradually released into the frothing mixture prior to discharge onto a moving substrate or conveyor. The discharge head assures the frothed material is distributed across the width of the machine, either across a substantial portion of the slab stock machine or across a desired portion thereof. The slab stock machine can include a complete line or plant in which the frothed foam will be permitted to chemically react, fully rise, cure and then be cut into desired pieces.

From experimental tests has been also noted that critical factors for producing a large foam block are the equilibrium between foam profile angle, metering machine's throughout, conveyor speed and formulation characteristics, such as viscosity build-up reactivity, etc. According to present invention, because the mixture, when reaction begins, is already viscous and supports a steep rise angle, the foam's rising angle is no longer a limitation on the process conditions. The froth being discharged from the frothing cavity is a homogeneous pre-expanding mixture with a sufficiently high viscosity to avoid rise angle problems associated with prior production equipment and flexible slab stock lines. The viscosity is enough to sustain the production of high blocks, that have fully reacted, even at very slow speeds with steep fall plate angles. This condition is accomplished by controlling the expansion phase of the mixture, after the mix head, and allows for the progressive release of the blowing agent in the reacting mass. Accordingly, the four critical factors can be varied to achieve the desired density rather than having to be linked to a rigid set of parameters as was the case with prior foam processes. The speed and size of a line or plant can be tailored to the needs of the foam manufacturer with speeds from 1 to 5 meters per minute, and lengths as short as 20 meters or less, rather than the more conventional length of about 100 meters. This also permits a smaller volume per hour of exhaust to be dealt with and removed or scrubbed, simpler metering and plant fabrication, foams made with $CO_2$, a smaller volume of air to be conditioned, and very low densities down to about 14 kg/m$^3$ or less.

BRIEF DESCRIPTION OF THE DRAWINGS

The invention and preferred embodiments thereof, will be now described in great detail, with reference to the accompanying drawings, in which.

DETAILED DESCRIPTION OF THE PRESENT INVENTION

Figure 1:
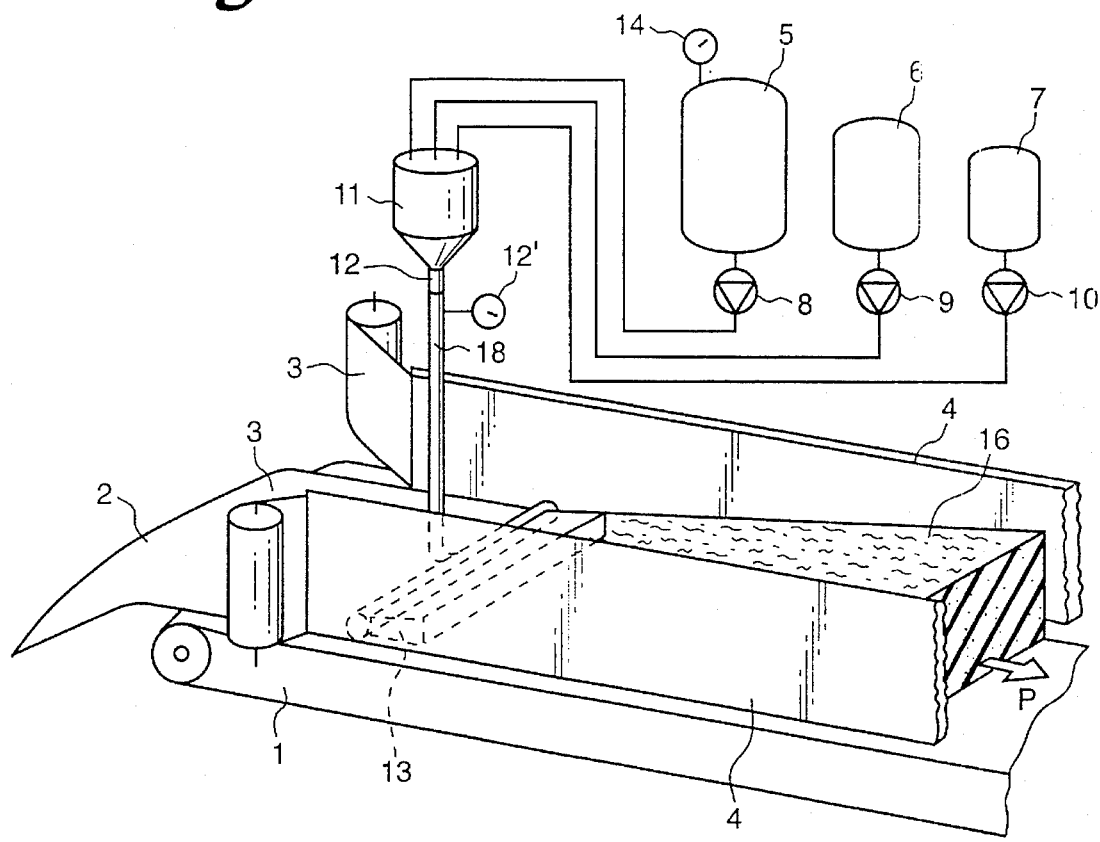
FIG. 1 shows a system which operates according to the frothing and foaming process of the present invention.
Figure 2:
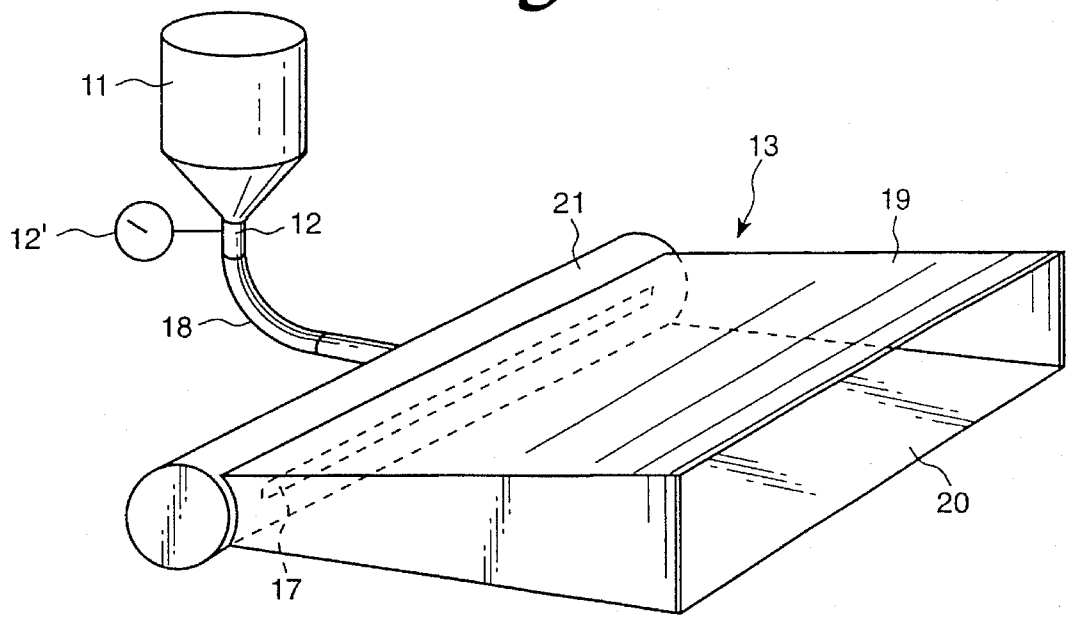
FIG. 2 is an enlarged view of a frothing device embodying the features of the present invention.

The essential features of the invention are now described in great detail with reference first to the appended FIGS. 1 and 2. As shown, the apparatus for performing the process according to the invention, is provided with two side walls 4 arranged to be perpendicular to the conveyor 1. Continuous side papers 3 are arranged to run and move along the inside of each side wall 4 in the production direction P (see the arrow) of the foam. A continuous paper sheet 2 slightly wider than the distance between the side walls 4, is fed onto the conveyor 1 to provide a foaming path. The excess layer at each side is turned up so as to form a seal against the bottom edge of the side papers 3. The bottom paper 2 and the side papers 3 effectively form a continuous open-topped trough, which could be, for example, about two meters wide by 1 meter high. The conveyor 1 may be substantially arranged with a horizontal disposition or, alternatively, it may be formed with a small angle such as six degrees.

Figure 5:
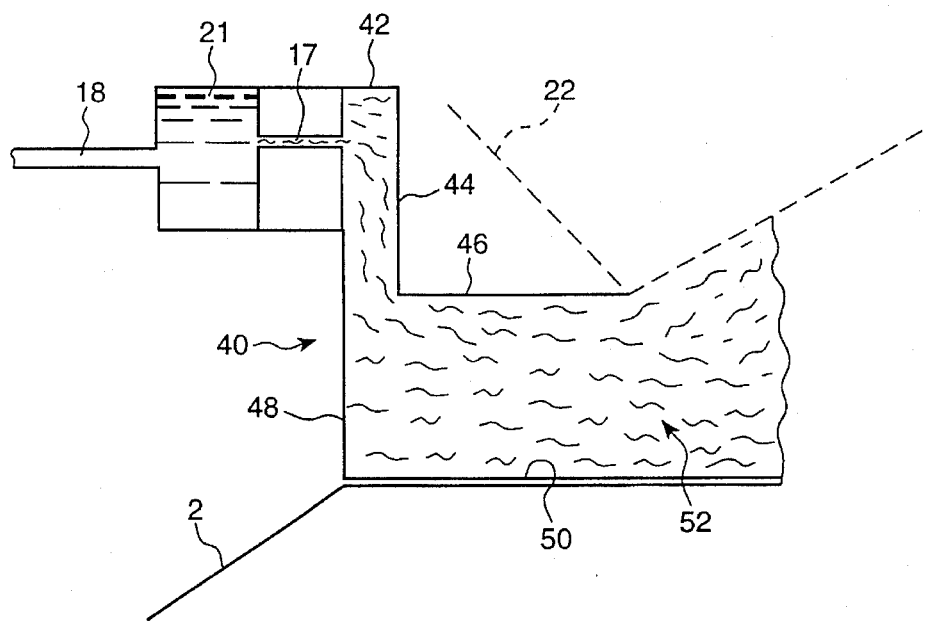
FIG. 5 is an enlarged view of the frothing device of previous FIG. 4.

The apparatus furthermore comprises a mixer 11 having an outlet 12 positioned at a level above the conveyor 1, for feeding a mixture of reactive chemical components to a frothing device, generally indicated at 13, and schematically shown in the detail of FIGS. 2 and 5.

A pressure gauge 12' is provided at the outlet spout 12 of the mixing device 11 to indicate the pressure of mixed chemicals which leave the mixing chamber through the outlet 12. Tanks 5, 6 and 7 are provided to hold the foam forming chemical components such as a polyol and an isocyanate as well as conventionally used chemical additives comprising a low boiling blowing agent such as $CO_2$. From each of the tanks, the chemical components and blowing agent are fed to the mixer 11 by pipes and respective metering pumps 8, 9 and 10.

According to the embodiment as shown in FIG. 2, the outlet spout 12 of the mixer 11 is connected by tubing 18 to the mixture frothing device 13 transversally extending across the conveyor 1. The frothing device 13 includes drop-pressure generating means comprising an elongated drop-pressure zone in the form of an elongated slot 17. It should be understood that the purpose of the elongated pressure drop zone is to provide a back-pressure and allow the mixing under pressure of chemical components into the mixer 11 as well as an equalization of the pressure in the same frothing device, before the pressure reduction, to prevent turbulent evaporation of the blowing agent during frothing of the mixture. At the same time the frothing device 13 allows frothing of the mixture under restrained and pressure controlled conditions. The frothing device 13 also assures that the resulting froth is smoothly delivered onto the substrate 2, 3 while the same mixture is flowing in the moving direction of the conveyor device.

Figure 6:
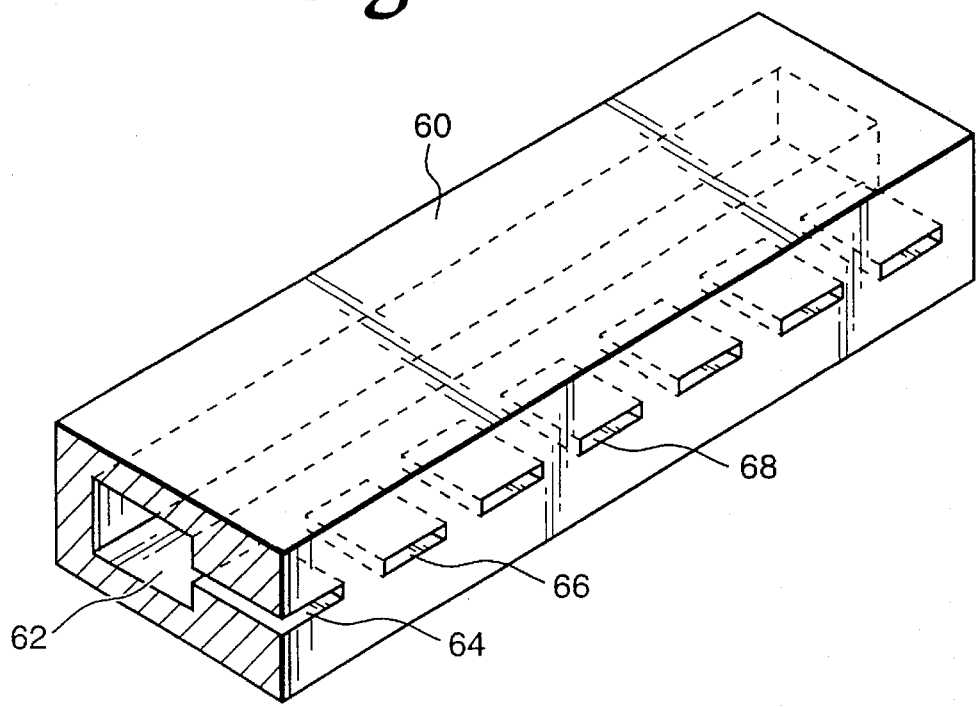
FIG. 6 shows an enlarged detail of a further frothing device.
Figure 7:
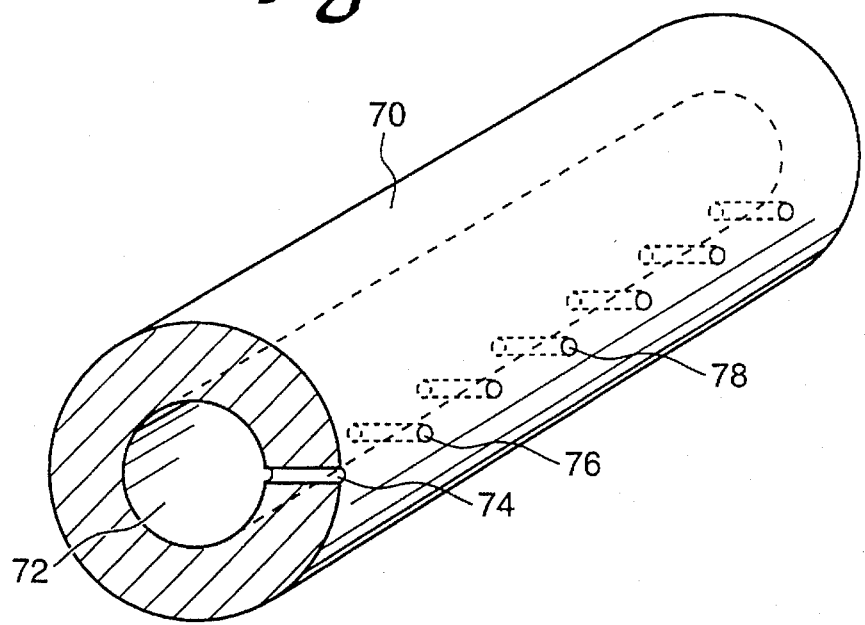
FIG. 7 shows another embodiment of the frothing device according to the invention.

As referred above, and shown in the example of FIG. 2, the pressure equalizing and frothing device 13 can, for example, comprise a tubular member defining an elongated pressure equalizing chamber 21 having a longitudinal axis. Chamber 21 is connected at one or more feeding points, to the mixer 11 by at least one tubing arrangement 18. The pressure equalizing or tubular chamber 21 is provided with a pressure-drop zone, for example, in the form of the elongated slot 17 which extends longitudinally along one side of chamber 21. However, the pressure drop zone could be formed from other suitably shaped pressure-drop apertures for flowing the mixture before frothing. As is shown in FIGS. 6 and 7, the discharge or gate bar could include a series of apertures of circular, oblong or rectangular shape, or a series of elongated, but shorter, slots so long as the controlled conditions were produced. The slot or more precisely said pressure-drop zone 17 has a restricted cross-sectional area sufficient to cause a pressure reduction in the mixture emerging from the chamber 21 during frothing, and a corresponding back pressure in the mixing device 11 for the purpose mentioned above.

Froth control, to obtain the controlled conditions that are desired during lay down of the froth, is accomplished by use of an enlarged cavity, such as is shown at 19 having an outlet aperture 20 from which the frothing mixture is delivered onto the moving substrate.

The enlarged frothing cavity 19 has a suitable configuration that will provide flow control over the frothing mixture and in particular the cross-sectional area of the output aperture 20 should be greater than the cross-sectional area of pressure-drop zone, such as the elongated slot 17, which provides communication between the pressure equalizing chamber 21 and the frothing cavity 19. The sectional area of the output aperture 20 should range from ten to hundreds of times, or more, the sectional area of the pressure-drop zone in the form of the elongated slot 17.

In the embodiment shown in FIG. 1, the frothing device 13 is delivering the frothed mixture onto the substrate 2/3 which is moving on the conveyor 1 along a substantially horizontal path. The conveyor may be operated at a rate of about 1 to 5 meters per minute, so that the full block height may be achieved within a range of about 1 to 8 meters from the deposit point of the froth.

The above example of FIG. 1 refers to a system in which the foam rise upwardly from the bottom of the conveyor.

Figure 3:
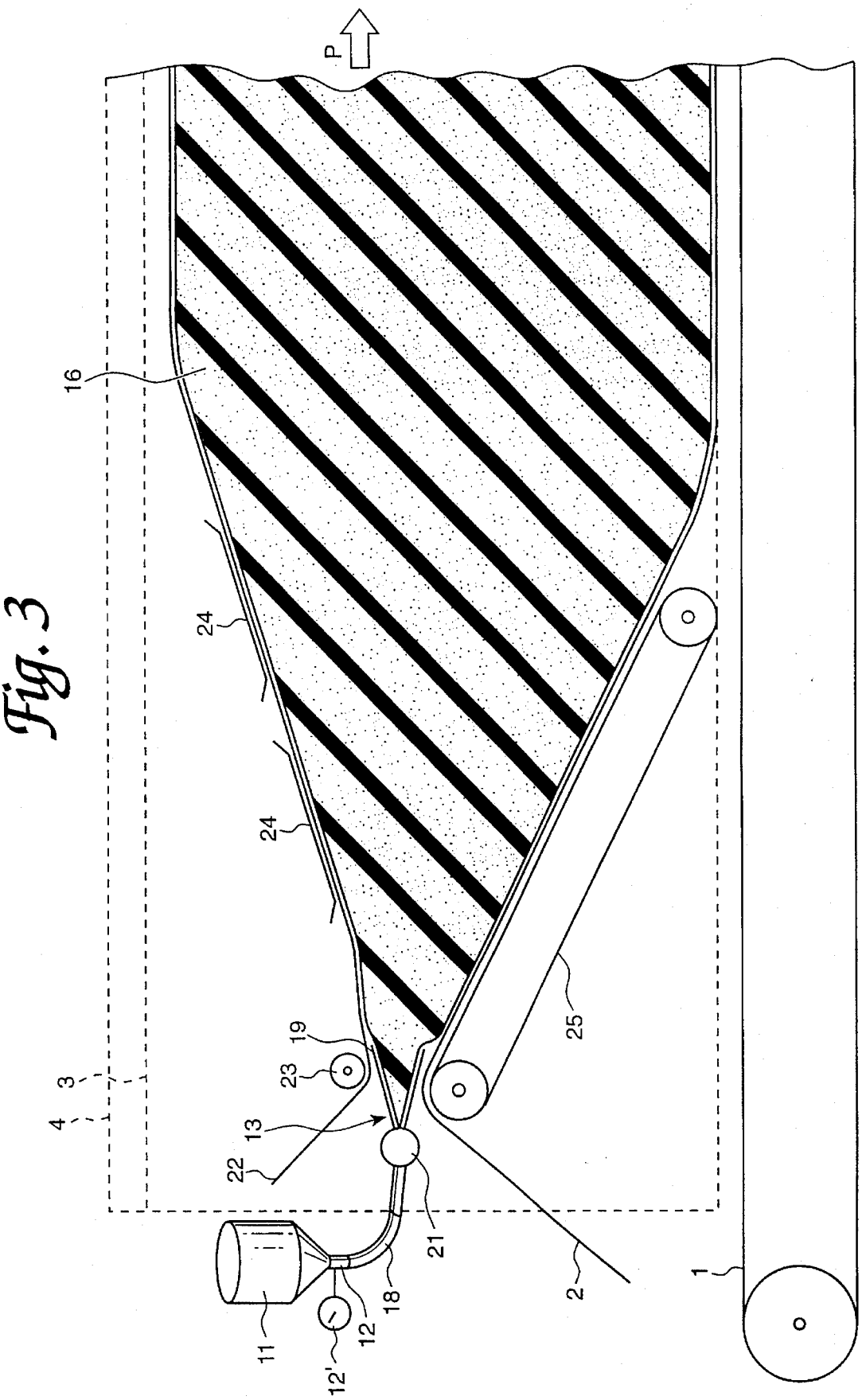
FIG. 3 shows a second system embodying the features of the present invention.

The example of FIG. 3 refers to a different system in which the foam is allowed to froth onto a downwardly sloping path which allows the length of the machine to be greatly reduced. According to the embodiment, the sloping angle of the conveyor, onto which the frothing mixture is discharged, is not critical due to the high viscosity of the froth emerging from the frothing cavity. Therefore, underrunning does not occur.

The continuous slab-stock machine of FIG. 3 continues to employ a main conveyor 1, together with the associated side walls 4 and side and bottom papers 2 and 3, and that conveyor 1 is in a horizontal position.

This embodiment also includes a second driven conveyor 25 inclined at an angle α, for example of about 30 degrees to the horizontal, and positioned between the side walls and side papers in such a manner that its lower end is immediately above the main conveyor 1. The pressure equalizing and frothing device 13, such as the one described in Example of FIG. 1 has been positioned immediately above the upper surface of the conveyor 25 at its highest point. As an alternative to the conveyor 25, it is possible to use a slide surface, such as a fall-plate for establishing the downwardly directed path. The angle α preferably can vary from about 10° to about 40° with a range of about 25° to about 30° being the preferred angle.

The bottom paper 2 in this case, runs onto and down the upper surface of the slanted conveyor 25 and then onto and along the main conveyor 1.

A second continuous paper 22 runs under a roller 23 so that it just clears the upper surface of the frothing cavity 19 and in such a manner that the paper 22 rests on and runs with the top surface of the expanding foam 16.

Optional pressure plates 24 are fitted so as rest on the top side of the paper 22, if required, to assist in shaping of the expanding foam.

Comparative tests have been conducted in the continuous manufacture of slab-stocks by means of a process and a system according to present invention, in comparison with a conventional system.

EXAMPLES

Example 1

According to this comparative example, a conventional continuous slab-stock machine as described in FIG. 1 was used except for the frothing device 13 which had been eliminated. A blend of chemicals, identified as Blend A in the following Table 1, was made and introduced into tank 5. The 80:20 TDI, Part B, was introduced into tank 6. Tank 7 held stannous octoate catalyst, Part C.

The pumps 8, 9 and 10 were set to give the outputs as defined in Table 1 for Parts A, B and C respectively. Conveyor 1 was set to run at a speed of 5 meters per minute.

The foam-forming chemicals, coming from the mixer, were allowed to pour from the mixing head outlet 12 directly onto the paper 2. The reading on the pressure gauge 12' was zero.

Expansion of the foam 16 started at a point along the length of the conveyor 1 about 0.8 meters from the mixing head 11. This represented a time of about 12 seconds from mixing.

The foam was fully expanded by a point about 8 meters from the mixing head 11. This represented a time of about 105 seconds from mixing. The height of the foam block after it had cured was 0.8 meters. The density of a sample of foam cut from the block was 21.5 kg/m$^3$. The cell structure of the foam was of a consistent quality with few irregular shaped cells, oversized cells or voids being present.

TABLE 1

|  | Parts by weight | Examples 1–3 Output in kg/min | Example 4 Output in kg/min |
| --- | --- | --- | --- |
| PART A |  | 120 | 24 |
| Polyether Polyol, 3500 mw | 100.00 |  |  |
| Water | 4.50 |  |  |
| Amine catalyst, Niax A1 | 0.10 |  |  |
| Silicone, Tegostab B2370 | 1.20 |  |  |
| PART B |  | 62.4 | 12.5 |
| 80:20 TDI | 55.2 |  |  |
| PART C |  | 0.25 | 0.05 |
| The catalyst, stannous octoage | 0.22 |  |  |

NIAX is a Trade mark of Union Carbide
TEGOSTAB is a Trade Mark of TH Goldschmidt (blowing agent having comparatively low cost)

Example 2

According to this comparative example, the same slab-stock foam machine as used in Example 1 was utilized. In this case the blend of chemicals designated Part A in Table 1, which was in the tank 5 was saturated with carbon dioxide gas at pressure, by addition of a quantity of liquid carbon dioxide. Sufficient liquid carbon dioxide was added to achieve a pressure in tank 5, as indicated by the pressure gauge 14, of 6 bar.

The slab-stock foam machine was operated in the same manner as described in Example 1.

This time, the chemicals left the mixing head outlet tube 12 in the form of a turbulent froth. It was also noticed that large bubbles of gas were forming in the foam after being deposited on the bottom paper 2. The pressure indicated by the pressure gauge 12' on the outlet 12, was zero.

The foam expansion was completed at a distance of about 7 meters from the mixing head 11.

When the foam block had cured, it was found to have a height of 0.9 meters, indicating that more expansion had occurred than in Example 1.

The density of a sample of foam cut from the block was found to be 19 kg/m$^3$.

The cell structure of the foam was inconsistent, there being present in the foam large ovaloid voids or pin holes up to 30 millimeters high by up to 10 millimeters diameter. The presence of these irregularities in the cell structure made the foam commercially unacceptable.

Example 3

According to the invention the same slab-stock frothing foam machine as used in Example 1 and 2 was employed, except that a frothing device 13 according to the invention, was fitted to the mixing head outlet (12) so as to equalize the pressure of the foam forming chemicals across the width of the conveyor (1) before allowing them to froth by reducing their pressure on passing through pressure drop zone 17 of the pressure equalising chamber 21.

The pressure equalizing, frothing device illustrated diagrammatically in FIG. 2, consisted of a 1.9 meter length of steel tube 21 of internal diameter 30 millimeters. Along the length of the pressure equalizing chamber 21, in the form of a steel tube was cut a slot 17 of a height of 0.5 millimeter, and a length of 1.85 meters. An inlet tube 18 was fitted onto the slotted tube 21, which was in turn connected to the mixing head outlet 12.

A frothing cavity 19 in the form of a diverging diffuser/baffle 19 was attached to the outside of the gate bar or the pressure equalization chamber 21 so as to form a diverging enclosed path from the elongated slot 17 to the rectangular outlet 20 of the diffuser/baffle. The dimensions of the outlet aperture of frothing cavity were 1.85 meters wide by 0.2 meters high. The length of the diffuser baffle form of the frothing cavity from the slot to the outlet aperture was 0.5 meter.

The slotted tube, with the diffuser/baffle, was fitted onto the slab-stock foam machine so that the outlet aperture 20 was just above the bottom paper 2 and facing down the conveyor 1 in the direction of production as shown by arrow P.

The gate bar 60 could have the configuration shown in FIGS. 6 and 7. In FIG. 6 the bar had a rectangular outer shape as well as a rectangular cross-sectional inner chamber 62. A series of elongated slots, as are shown at 64, 66 and 68, for example, could be used to provide the desired outlet from the gate bar 60 and the desired pressure drop. In FIG. 7 the gate bar 70 is provided with a circular cross-sectioned interior chamber 72 from which a series of tubular outlet apertures, as shown at 74, 76 and 78, for example, axially extend in the flow direction to provide the desired openings and pressure drop.

The slab-stock foam machine was run in the same manner as for Example 2. The pressure in the tank 5 was again 6 bar as shown by pressure gauge 14; the pressure in the mixing chamber was about 18 bar.

We have found that the pressure drop in the gate bar, or the pressure equalizing chamber 21 should be a significant part of the total pressure drop from the mixing chamber onwards.

This time, the foam emerged from the rectangular aperture outlet 20 as a smooth froth. There was no evidence of large bubbles being present in the expanding foam. The pressure indicated by the pressure gauge 12' on the mixing head outlet tube 12 was 6 bar.

Foam expansion was completed at a distance shorter than 7 meters from the outlet aperture of the outlet 20. In consequence of the high viscosity of the froth, according to the invention it is possible to reduce the velocity of the conveyor and to dramatically reduce the overall length of the line and therefore of the entire plant in comparison to a conventional one, without causing underrunning problems.

When the foam block had cured, it was found to have a height of 1 meter. The density of a sample of foam cut from the block was found to have a density of 17 kg/m$^3$. The cell structure was fine and contained no large voids. The foam quality was judged to be commercially acceptable.

Example 4

According to the invention the same chemical recipe was used in Example 3, with 6 bar pressure in the tank 5 containing the polyol blend/carbon dioxide mixture, in pressure gauge 12'.

In this case, however, the outputs of the pumps 8, 9 and 10 were reduced to one fifth of the outputs used in Example 3, as shown in Table 1 and the slot 17 reduced to a height of 0.4 mm.

The conveyors 1 and 21 were both run at a surface speed of 1 meter/minute.

The expanding foam 16 in this case reached full expansion at a distance of about 1.2 meters from the outlet 20.

The height of the cured foam block was 1 meter. The density of a sample of foam cut from the block was measured to be 17 kg/m$^3$. The cell structure was fine and similar to the foam made in Example 3. It contained no large voids. The quality was judged to be commercially acceptable.

The examples 3 and 4 in this specification clearly demonstrate the efficiency of the process according to the present invention by controlling the pressure drop and the frothing of the mixture in continuous production of polymeric foam material.

Example 5

The same chemical recipe has been used in the Example 4, except for the $CO_2$ content that has been increased as described below. The embodiment has been modified in order to pump the liquid $CO_2$ in a continuous way rather than pre-mixing it in the tank with the polyol. A pump 54, shown in FIG. 4, has been added in order to mix the liquid $CO_2$ from the tank 55 in the polyol stream with the aid of a static mixer 53. A pressure reducing valve 56 has been introduced in order to assure that the pressure in the polyol line is maintained that will keep the $CO_2$ in a liquid state at the working temperature before the static mixer 53. The liquid $CO_2$ has been pumped in the polyol stream at an output to correspond to a weight ratio of 4% ($CO_2$ on polyol). The liquid $CO_2$ could be pumped as well in the isocyanate stream. The slot 17 has been further reduced in height to about 0.3 mm. The pressure gauge 12' indicated a pressure of 15 bars. All the other parameters were maintained as in Example 4.

The height of the cures block was 1.2 meters and the density was 14 kg/m$^3$. The cell structure was good.

Experimental tests conducted for a long time demonstrated the real possibility to use $CO_2$ as primary blowing agent in an effective manner, having a smooth and homogeneous frothing of the reactant mixture on the moving substrate, as well as the foaming of the material while running on the conveyor at a comparatively low velocity, thus resulting in a machine of substantially reduced length and output in respect of machines which make use of a conventional process or frothing technique.

In conventional mechanical mixing of flexible polyurethane foams, it is well known that it is necessary to add small amounts of nucleating gas to the liquid reactants during mixing. The purpose of the nucleating gas is to provide nucleation sites for cell formation at the start of foaming. Typically, nucleating gas such as air or nitrogen would be added at a rate of 0.3 to 3N liters per minute for a mixing throughput of 100 kg/minute of chemical reactants.

According to the invention we have also found that when liquid carbon dioxide is introduced into the liquid reactants as an auxiliary blowing agent, it is still advisable to add a nucleating gas. The gas, as would be expected, must be introduced into the mix at a sufficiently high pressure to overcome the pressure in the mixer. This pressure, as previously mentioned, can be about 5 to 18 bar.

We have further found that the quantity of nucleating gas can be considerably higher than in the case of conventional mechanical mixing of flexible polyurethane foam. At a pressure of 5–18 bar in the mixing head and a chemical throughput of 100 kg/minute, we have found it possible to add nucleating gas (e.g. nitrogen) at the rate of 10–40N liters/minute. If the lower addition rates typical of conventional mechanical mixing are used, the foam cell structure is very coarse, of low porosity and the foam product is not of commercial quality.

Figure 4:
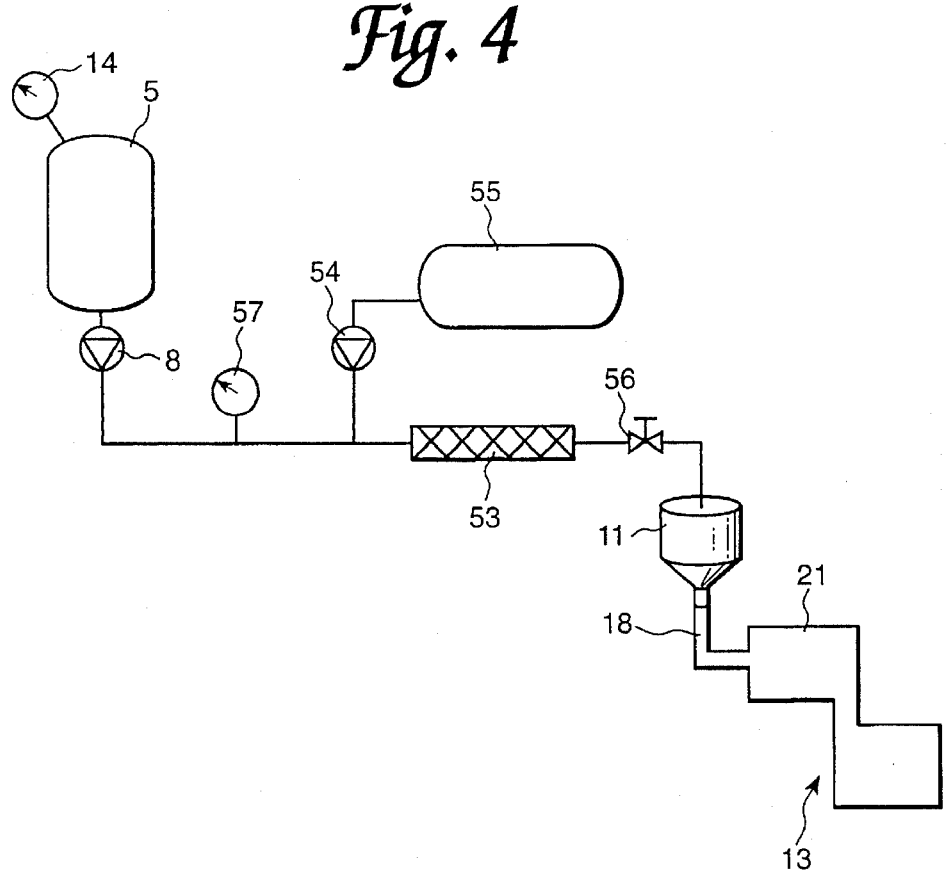
FIG. 4 shows a further system embodying a modified form of a frothing device.

With reference now to FIGS. 4 and 5 an alternative form of the apparatus and the frothing device are shown.

According to the example of FIG. 4, in accordance with the present invention, the liquid $CO_2$ contained in the tank 55, by means of a metering pump 54, is directly injected in the flow of polyol fed from the tank 5 as in the example of FIG. 1. More precisely the liquid $CO_2$ is fed into the flow of polyol upstream a static mixer 53 connected to the high pressure mixer 11 for the polyurethane components by means of a pressure-reducing valve 56. The valve 56 serves to ensure that the pressure in the polyol line be such to maintain the $CO_2$ in the liquid state, at the working temperature. The liquid $CO_2$ could be differently introduced into the flow of isocyanate fed from tank 6, in FIG. 1.

Reference 13 in FIG. 4 indicates an alternative embodiment of the pressure equalising and frothing device for the polyurethane mixture, shown in detail in FIG. 5. The tube 18 in FIG. 5, still comes from the mixing chamber 11, as in the embodiments shown in FIGS. 1–3 and the pressure euqalization chamber or gate bar 21 is employed. Here the chamber 21 has a rectangular cross-sectional shape and shapes other than circular or rectangular could be used. The gate bar also includes a pressure reduction aperture 17. Aperture 17 opens into a modified frothing cavity, generally indicated at 40. Frothing cavity 40 is comprised of a top wall 42 that is attached to the gate bar and extends outwardly for a distance of about 10 mm. Wall 42 terminates at wall 44 positioned at an angle of about 90° with respect to wall 42. Wall 44 extends downwardly for about 30 mm and extends past the outlet of slot 17. Accordingly, the emerging frothing mixture will intersect walls 42 and 44 and have its direction turned 90° relative to the flow through slot 17. We have found that ending the frothing cavity at this point, that is at the end of wall 44, and a portion of the rear wall 48, can produce results that are satisfactory for controlling frothing and for providing suitable back pressure on mixing chamber 11. We prefer, however, to continue the frothing cavity by continuing rear wall 48 for a distance of about 40 mm, by having a bottom wall 50 extend away from rear wall 48, at an angle of about 90°, for a distance of about 50 mm. and by having top wall 46 extend from wall 44 at an angle of 90° and for a distance of about 40 mm. Walls 46 and 50 are positioned to be substantially parallel although they could diverge at a slight angle of about 10° to about 20°.

By employing flow diverting walls 46 and 50 the frothing mixture makes another 90° turn, this time relative to the direction the frothing mixture is flowing by reason of walls 42, 44 and the top portion of rear wall 48. Passage of the frothing mixture through the frothing cavity allows frothing to begin and occur, initially, under pressure controlled conditions. Passage by the frothing mixture through the frothing cavity helps the initial frothing process to develop without the turbulence associated with direct injection systems. The resulting froth emerges in a smooth flowing manner from the outlet and produces a smooth, free flowing transition onto the moving substrate in non-turbulent condition as a creamed froth. Distribution is enhanced and the further transition from frothing to reaction of the chemical ingredients, and foam growth as in generally indicated at 52, also occurs smoothly and more completely.

As FIG. 3 shows, the frothing cavity can be used with the moving continuous paper sheet and, where desirable, can also be used with the top side paper sheet 22.

It is however evident that different or equivalent solutions are possible, in respect to the examples previously described, without departing from the innovative principles of the present invention as claimed.

What is claimed is:

1. A device for controlling frothing of a polyol, isocyanate and liquid $CO_2$ blowing agent mixture comprised of a housing having a pressure equalization chamber provided therein and an inlet for the mixture leading into said pressure equalization chamber, at least one outlet aperture leading away from said pressure equalization chamber and a frothing cavity attached to said housing and positioned to receive the mixture flowing from said at least one outlet aperture, said at least one outlet aperture being dimensioned to maintain back pressure on the upstream mixture to keep the liquid blowing agent in a liquid state and to initiate frothing under pressure controlled conditions to avoid turbulent evaporation of the blowing agent upon discharge of the mixture from the outlet aperture, said frothing cavity being comprised of a series of interconnected and differently oriented wall members that deflect the direction of flow of the mixture flowing from said at least one outlet aperture.

2. A device as in claim 1 wherein said at least one outlet aperture comprises a slot having a length elongated in the direction of flow.

3. A device as in claim 1 wherein said frothing cavity forms the mixture flowing therethrough into a progressively non-reactive expanding frothing material by progressively releasing the blowing agent into the frothing material as the frothing material flows along the frothing cavity.

4. A device as in claim 1 wherein said frothing cavity further includes at least one substantially right angle turn positioned downstream from said at least one outlet aperture.

5. A device as in claim 4 wherein said substantially right angle turn is positioned directly adjacent said at least one outlet aperture.

\* \* \* \* \*